(12) United States Patent
Maruyama et al.

(10) Patent No.: US 8,601,608 B2
(45) Date of Patent: Dec. 3, 2013

(54) CANTILEVER FOR SCANNING PROBE MICROSCOPE AND SCANNING PROBE MICROSCOPE EQUIPPED WITH IT

(75) Inventors: Kenichi Maruyama, Yokohama (JP); Koji Suzuki, Yokohama (JP); Masato Iyoki, Chiba (JP)

(73) Assignees: Japan Science and Technology Agency, Kawaguchi-shi (JP); SII Nanotechnology Inc., Chiba-shi (JP)

( * ) Notice: Subject to any disclaimer, the term of this patent is extended or adjusted under 35 U.S.C. 154(b) by 598 days.

(21) Appl. No.: 11/887,348

(22) PCT Filed: Mar. 30, 2006

(86) PCT No.: PCT/JP2006/306648
§ 371 (c)(1),
(2), (4) Date: Mar. 2, 2010

(87) PCT Pub. No.: WO2006/106818
PCT Pub. Date: Oct. 12, 2006

(65) Prior Publication Data
US 2010/0154085 A1      Jun. 17, 2010

(30) Foreign Application Priority Data

Mar. 31, 2005   (JP) ................................. 2005-100934

(51) Int. Cl.
*G01Q 60/22*  (2010.01)
(52) U.S. Cl.
USPC .......................................................... 850/32
(58) Field of Classification Search
USPC ..................... 850/6, 24, 32; 73/105; 250/234
See application file for complete search history.

(56) References Cited

U.S. PATENT DOCUMENTS 5,260,567 A * 11/1993 Kuroda et al. ............ 250/227.19
5,410,151 A *  4/1995 Buckland ................. 250/227.26
(Continued)

FOREIGN PATENT DOCUMENTS

JP    8-129017 A    5/1996
JP    9-229948 A    9/1997
(Continued)

OTHER PUBLICATIONS

Sho Ogawa et al., The Japan Society of Applied Physics, Separate vol. 3, Sep. 1, 2004, pp. 914.

(Continued)

*Primary Examiner* — Robert Kim
*Assistant Examiner* — Jason McCormack
(74) *Attorney, Agent, or Firm* — Birch, Stewart, Kolasch & Birch, LLP (57) ABSTRACT

A microscope including both an atomic force microscope and a near-field optical microscope and capable of performing electrochemical measurements and a cantilever for the microscope are disclosed. A pointed light transmitting material employed as the probe of an atomic force microscope is coated with a metal layer; the metal layer is further coated with an insulating layer; the insulating layer is removed only at the distal end to expose the metal layer; the slightly exposed metal layer is employed as a working electrode; and the probe can be employed not only as the probe of the atomic force microscope and the near-field optical microscope but also as the electrode of an electrochemical microscope. Consequently, the microscope can have the functions of an atomic force microscope, a near-field optical microscope and an electrochemical microscope.

19 Claims, 3 Drawing Sheets

(56) References Cited

U.S. PATENT DOCUMENTS

| | | | |
|---|---|---|---|
| 5,838,005 A * | 11/1998 | Majumdar et al. | 850/9 |
| 5,894,122 A * | 4/1999 | Tomita | 250/234 |
| 5,939,623 A | 8/1999 | Muramatsu et al. | |
| 5,990,474 A * | 11/1999 | Atia et al. | 250/234 |
| 6,396,050 B1 * | 5/2002 | Yamamoto et al. | 250/216 |
| 6,438,092 B1 * | 8/2002 | Hoshino | 369/126 |
| 6,737,331 B1 | 5/2004 | Lewis et al. | |
| 6,794,296 B1 * | 9/2004 | Kassing et al. | 438/706 |
| 6,834,537 B1 * | 12/2004 | Niwa et al. | 73/105 |
| 6,852,968 B1 * | 2/2005 | Ouchi et al. | 250/234 |
| 6,891,151 B2 * | 5/2005 | Shimada et al. | 250/234 |
| 6,953,930 B2 * | 10/2005 | Murashita | 850/57 |
| 7,067,806 B2 * | 6/2006 | Watanabe et al. | 250/306 |
| 2003/0140425 A1 * | 7/2003 | Ping | 7/128 |
| 2003/0141444 A1 * | 7/2003 | Mitsuoka et al. | 250/234 |
| 2004/0004182 A1 * | 1/2004 | Kranz et al. | 250/234 |
| 2004/0126073 A1 * | 7/2004 | Chiba et al. | 385/123 |

FOREIGN PATENT DOCUMENTS

| | | |
|---|---|---|
| JP | 11-248720 A | 9/1999 |
| JP | 2001-4519 A | 1/2001 |
| JP | 2003-511690 A | 3/2003 |
| JP | 2003-536059 A | 12/2003 |

OTHER PUBLICATIONS

Sho Ogawa et al., Dai 65 Kai Bunseki Kagaku Toronkai Koen Yoshishu, May 1, 2004, pp. 67.

Sho Ogawa et al., The Electrochemical Society of Japan Dai 71 Kai Taikai Koen Yoshishu, Mar. 24, 2004, pp. 89.

* cited by examiner

Evaluation of Resolving Power (10 μm Comb-shaped Electrode)

Fig. 6

CANTILEVER FOR SCANNING PROBE MICROSCOPE AND SCANNING PROBE MICROSCOPE EQUIPPED WITH IT

TECHNICAL FIELD

The present invention relates to a cantilever for a scanning probe microscope and a scanning probe microscope equipped with it. The scanning probe microscope of the present invention can function as an atomic force microscope, a near-field optical microscope and an electrochemical microscope.

BACKGROUND ART

"A scanning probe microscope" is a general term for a microscope by which a sample is examined by scanning the very close vicinity of the sample using a sharp pointed probe, typical one being known as an atomic force microscope. As an atomic force microscope, the one equipped with a cantilever with a tip curved like a hook and which tip is used as a probe is known. The surface shape of a sample is observed by measuring the displacement of the cantilever which is based on the interatomic force between the sample and the tip of the probe.

A scanning probe microscope is also known which has functions of an atomic force microscope and an near-field optical microscope at the same time by forming the cantilever and probe for such an atomic force microscope with a light transmitting substrate, by coating the probe except for the tip of the probe or including the tip of the probe with a metal layer, and by using the probe as a probe of the near-field optical microscope (Patent Literature 1). That is, when a laser beam is guided through the cantilever to the tip of the probe, an evanescent light is radiated from the tip of the probe. And, for example, a fluorescence labeled sample or the like is excited by this evanescent light to emit fluorescence, and the sample can be observed optically by detecting the emitted fluorescence. In this way, by using the microscope having functions of an atomic force microscope and an near-field optical microscope at the same time, the shape of a sample can be observed by the atomic force microscope, as well as a wide variety of fluorescence labeled substances can be observed. Therefore, by observing a cell by using the microscope, for example, a minute shape of the cell and the intracellular distribution of fluorescent labeled calcium ion, potassium ion, magnesium ion and the like can be observed at the same time.

On the other hand, co-inventors of the present invention invented a method of forming a very small electrode by electrodepositing resin covering on the whole surface of the metal layer using a metal layer which was formed on a pointed optical fiber beforehand as an electrode and by exposing the metal layer under the resin covering by shrinking the resin covering by heating to break the tip of the resin covering (Patent Literature 2).

Patent Literature 1: JP 2704601 B
Patent Literature 2: JP 2004-45394 A
Patent Literature 3: JP 2001-208671 A
Patent Literature 4: JP 3264824 B
Patent Literature 5: JP H9-89911 A
Patent Literature 6: JP H11-51943 A

DISCLOSURE OF THE INVENTION

Problems to be Solved by the Invention

A microscope which has functions of an atomic force microscope and a near-field optical microscope at the same time as described in Patent Literature 1, by which information of surface shape of a sample and optical information such as fluorescence can be obtained at the same time, exhibits its greatest performance when a biological sample such as a cell is observed. However, for example, chemical reactions in a cell cannot be measured electrochemically even by this microscope. The present inventors considered that if electrochemical measurements could also be performed by the microscope having functions of an atomic force microscope and a near-field optical microscope at the same time, it could be of great help for physiological studies of intracellular level, because chemical reactions occurring in a cell could be measured, the distribution of neurotransmitter such as dopamine and serotonin, for example, could also be observed and the relation between the shape of a cell and chemical information could be examined. However, a microscope having functions of an atomic force microscope and a near-field optical microscope at the same time which can also perform electrochemical measurements is not known.

Accordingly, an object of the present invention is to provide a microscope having functions of an atomic force microscope and a near-field optical microscope at the same time which can also perform electrochemical measurements, as well as to provide a cantilever and a probe therefor.

Means for Solving the Problem

The present inventors intensively studied to consider that by coating a light transmitting substrate used as a probe for an atomic microscope with a metal layer, further coating the metal layer with an insulating layer, exposing metal layer by removing only the tip of the insulating layer and utilizing the little exposed metal layer as a working electrode, the probe could be used not only as an probe for an atomic force microscope and a near-field optical microscope but also as an electrode for an electrochemical microscope, therefore functions of an atomic force microscope, a near-field optical microscope and an electrochemical microscope could be equipped at the same time thereby completing the invention.

That is, the present invention provides a cantilever for a scanning probe microscope, the cantilever comprising: a probe provided on the tip of the cantilever, which probe comprises a substrate that is at least partly light transmitting, a conductive layer formed on the substrate and an insulating layer laminated on the conductive layer, wherein the insulating layer is absent at the tip of the probe so that the conductive layer is exposed; and an optical waveguide communicating with the light transmitting substrate of the probe, the light transmitting substrate existing continuously up to the tip of the probe. The present invention also provides a straight probe for a scanning probe microscope, the probe comprising a substrate that is at least partly light transmitting; a conductive layer formed on the substrate; and an insulating layer laminated on the conductive layer; the insulating layer being absent at the tip of the probe so that the conductive layer is exposed; the light transmitting substrate existing continuously up to the tip of the probe. The present invention further provides a process of producing the cantilever of the present invention, the process comprising the steps of forming the conductive layer on the substrate; forming the insulating layer by electrodeposition of an insulative paint using the conductive layer as one of electrodes; and heating the formed insulating layer to expose the conductive layer at the tip of the probe. The present invention still further provides a process of producing the cantilever of any one of claims 1 to 8 or the probe of any one of claims 9, the process comprising the steps of forming the conductive layer on the substrate; and forming the insulating layer by electrodeposition of an insulative paint using the conductive layer as one of electrodes. The present invention still further provides a scanning probe microscope comprising the cantilever of the present invention.

EFFECTS OF THE INVENTION

By the present invention, a scanning probe microscope which has functions of an atomic force microscope, near-field optical microscope and electrochemical microscope at the same time, and a cantilever for a scanning probe microscope cantilever which enabled the scanning probe microscope to have the functions was provided for the first time. Because the scanning probe microscope of the present invention has functions of an atomic force microscope, a near-field optical microscope and an electrochemical microscope at the same time, for example, the surface shape of a cell, fluorescence and electrochemical observation of a variety of chemical reactions can be performed at the same time, and it exhibits its greatest performance in studies on physiology and the like.

BEST MODE FOR CARRYING OUT THE INVENTION

Figure 1:
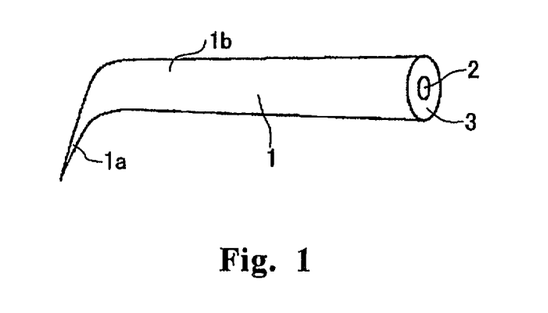
FIG. 1 is a perspective vies of a preferred basic form of the cantilever of the present invention.

Basic shape of the cantilever of the present invention may be the same as a cantilever of a known atomic force microscope as described in the Patent Literature 1. It is preferable that the tip of cantilever 1 is pointed and curved like a hook, preferably as shown in FIG. 1. The pointed tip portion 1a of the portion curved like a hook is used as a probe. It is preferable that a substrate of the probe has no edges and no steps and formed continuously except for the boundary between the tapered and pointed portion and the portion not tapered and except for the periphery of the very tip of the substrate when viewed from the tip of the probe. Further, there are a case where the very tip of the substrate of the probe is plane, and a case where the very tip of the substrate has a radius of curvature, and either shape is acceptable. In addition, it is preferable that the diameter of the very tip of the substrate is not more than 30 nm. Further, the boundary between the tapered and pointed portion and the portion not tapered, and the periphery of the very tip of the substrate when viewed from the tip of the probe may have a radius of curvature and may be a shape without edges. It is preferred that cantilever 1 including the probe portion 1a be formed smoothly without having steps or acute angle edges, and it is most desirable that the cantilever 1 is formed smoothly without having steps or edges. The term "acute angle" herein means an angle of not more than 90 degrees. Having no steps or edges is preferred because the problem that the step portions and the edge portions break does not occur.

At least probe 1a comprises a light transmitting substrate, and preferably, the whole cantilever comprises a light transmitting substrate such as an optical fiber, and is formed integrally with a probe portion. However, it is not necessary that the whole cantilever be formed of a light transmitting substrate, if the cantilever has an optical waveguide through which a light can be guided to the tip of the probe. The optical fiber is formed of a core 2 having a high index of refraction located at the center in the vertical cross-sectional view and a clad 3 having a low index of refraction which surrounds the core 2. Usually, the clad is removed and only the core is used as a substrate, because the very tip of the probe is pointed as described later.

The constitution of the cantilever is not limited to the above described one, and the cantilever may be the one made of silicon, silicon nitride or silicon oxide and having an optical waveguide, a penetrating hole for light transmission or the like.

Figure 2:
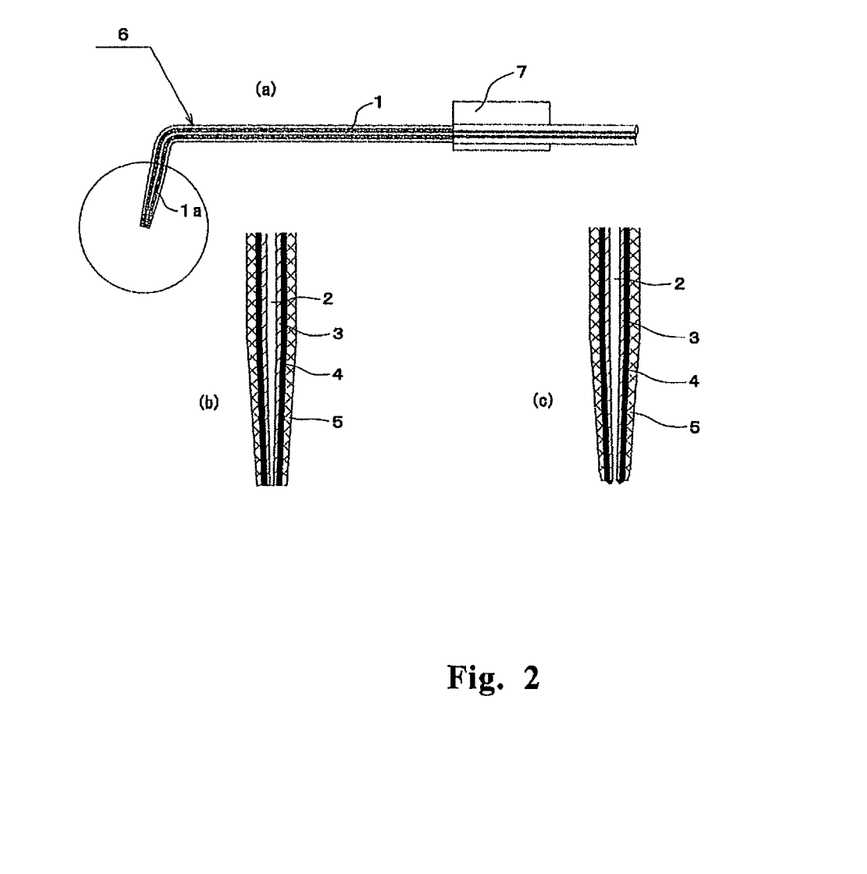
FIG. 2 is a schematic view of a preferred mode of the cantilever and cross-sectional views of the tips of preferred modes of the cantilever.

The probe of the cantilever of the present invention has, as shown in FIG. 2, a conductive layer 4 formed on the above-mentioned substrate and an insulating layer 5 laminated on the conductive layer 4. FIG. 2(a) schematically shows a cantilever having a basic shape as shown in FIG. 1, and (b) and (c) are schematic cross-sectional views of the tips of the probe (a) (the encircled portion). FIG. 2(b) is a view where the tip of the probe is provided with an opening by FIB described later, and (c) is a view where the tip of the probe provided with an opening by oblique deposition described later. Further, reference numeral 6 in FIG. 2(a) denotes a mirror surface (described later), and reference numeral 7 denotes a jig for fixing the cantilever. Normally, the conductive layer 4 and the insulating layer 5 are formed from the jig 7 to the tip, and the cantilever forms a three-layer structure comprising a core 2, a clad 3 and an optical fiber from the jig to the distal end. The conductive layer 4 is made of an electrically conductive material such as a metal, carbon or the like, and preferably, the outermost surface of the layer is made of gold, gold alloy platinum or a carbon such as graphite, which is highly chemically stable and highly conductive. The thickness of the conductive layer at the tip portion of the probe is not restricted and preferably about 10 to 400 nm, more preferably about 15 to 300 nm. The material which forms the insulating layer 5 is not restricted as long as it is an insulating material, and because the insulating layer 5 is preferably formed by electrodeposition as described later, it is preferable that the insulating layer be formed of an electrodeposition paint which forms an insulating coating film. A variety of electrodeposition paints which provide an insulating coating film are known and commercially available. These commercially available electrodeposition paints are preferably used in the present invention. The resin component which forms the coating film is not restricted at all, and either an anionic polymer or a cationic polymer may be used. Preferred examples include polyacrylic acids, polyethylene sulfonic acids and polyamino acids. The thickness of the insulating layer is not particularly restricted, and preferably about 10 nm to about 5000 nm, particularly about 100 nm to about 3000 nm.

At the tip of the probe, the insulating layer 5 is absent and the conductive layer 4 is exposed. The conductive layer 4 may cover the whole tip of the probe, or the conductive layer 4 may be absent partly or entirely at the tip of the probe. The conductive layer 4 except for the tip of the probe can be made to function as a light-shielding film preventing a light from leaking outside from the waveguide. Because the conductive layer 4 at the tip of the probe is thin, when a laser beam is radiated, an evanescent wave is emitted via the conductive layer 4. However, when a weak evanescent light is radiated or condensed, it is preferable that the conductive layer 4 be absent at least on the tip of the probe and that when viewed from the tip of the probe, the conductive layer 4 be formed on the periphery of an opening (the portion where the conductive layer is absent and the substrate is exposed) of the tip of the probe where the conductive layer 4 is absent and the insulating layer 5 be formed on the periphery of the conductive layer 4. In addition, when the opening is formed, it is preferable that the diameter of the opening at its distal end is about 0.2 nm to 200 nm.

The present invention also provides a straight probe for a scanning probe microscope, the probe comprising a substrate that is at least partly light transmitting; a conductive layer formed on the substrate; and an insulating layer laminated on the conductive layer; the insulating layer being absent at the tip of the probe so that the conductive layer is exposed; the light transmitting substrate existing continuously up to the tip of the probe. A straight probe for a scanning probe microscope itself is well-known in this field (e.g., Patent Literature 5 and Patent Literature 6), and is used by being supported such that its tip faces downward and its longitudinal direction is coincide with the vertical direction. The probe basically has a similar constitution except for being curved like a hook and functions similarly. The preferred constitution of the probe is similar to the preferred constitution of the above-described cantilever. That is, the probe is preferably a straight probe where the tip of an optical fiber is pointed and the pointed substrate is formed smoothly without steps or acute edges to the tip of the probe.

The cantilever of the present invention can be produced as follows. That is, firstly, by a known method, preferably by using an optical fiber, the substrate is formed in a shape in which the tip of the substrate is pointed and the substrate preferably has a smoothly curved shape without steps or edges. That is, the cantilever has no edges except for the boundary between the portion tapered and the portion not tapered, and except for the periphery of the tip of the probe, and is formed continuously without steps. Further, preferably, the cantilever has a smoothly curved shape, and the portion functioned as a cantilever and the portion which functioned as a probe are formed smoothly and continuously without steps. A sharpening process of the tip can be conducted by a method of drawing the both sides of an optical fiber to tear off while heating the optical fiber by irradiation with a laser beam (heat-draw method), or a method of etching an end of the optical fiber. Alternatively, a smaller tip can be formed by combining the both methods.

Here, an example of the sharpening method combining the heat-draw method and the etching method will now be described. An optical fiber having a core diameter of 3.2 μm and a clad diameter of 125 μm was used. A carbon dioxide laser is focused on the clad portion of the optical fiber, and the optical fiber is drawn from the both ends to break the optical fiber. By this, the tip of the optical fiber can be sharpened to the diameter of not more than 100 nm. Subsequently, the probe is made more sharpened by an etching process. In the etching process, an organic solvent such as heptane is developed on a 50% solution of hydrofluoric acid to attain a state of two-phase for the prevention of evaporation of the hydrofluoric acid, and the tip of the probe is etched by immersing into the solution of hydrofluoric acid below the interface for 3 minutes to 90 minutes. By this, the tip of the probe is sharpened to a diameter of not more than 50 nm. In this way, the probe portion was able to be formed smoothly without having steps or edges.

After sharpening the tip, the tip of the cantilever is curved like a hook. By focusing a carbon dioxide laser on the portion which is 0.1 mm to 2 mm from the tip of the sharpened optical fiber, the tip of the cantilever was transformed into a hook shape which has an angle of 60° to 90°, when the angle of the shape before the transformation is taken as 0°. In this case, because the side on which the laser beam is focused absorbs more heat than the other side, the tip of the optical fiber bends toward the direction to which the laser light is focused because of the surface tension of glass caused by softening. The length of probe portion 1a which is sharpened downward is not restricted, and usually 0.1 mm to 2 mm.

Subsequently, in order to form a reflecting surface for the laser light for detecting the displacement of the below-described cantilever, a part of the side of the cantilever opposite to the side at which the probe is provided by mechanically grinding the side with a whetstone to form the reflective surface.

Subsequently, a conductive layer is formed. The conductive layer is formed at least on the probe portion 1a (FIG. 1). The conductive layer may be formed on the other portion than the tip of the cantilever, which probe is held horizontally in FIG. 1. As described later, because the conductive layer on the tip of the probe is used as a working electrode, it is necessary to connect a working electrode lead wire to the layer. Therefore, it is preferable to form a conductive layer also on the other portion than the tip of the cantilever, and to connect the working electrode to this portion. The conductive layer serves also as a light-shielding film when a light is guided in the optical fiber. The conductive layer can be formed by a metal-deposition method such as a sputtering method, a vacuum deposition method or the like, and a vapor deposition method is preferred. The vapor deposition method can be conducted in the usual manner by using a commercially available vapor deposition apparatus. The range of preferred thickness of the conductive layer deposited is as stated above.

Subsequently, an insulating layer is formed on the conductive layer. This formation may be carried out by forming an insulating electrodeposition paint layer, for example, by electrodeposition using the conductive layer as one of the electrodes. The electrodeposition may be carried out by immersing the conductive layer and the counter electrode in the electrodeposition paint and applying a direct-current voltage between them. When the polymer in the electrodeposition paint is anionic, the conductive layer is set as an anode, and when the polymer in the electrodeposition paint is cationic, the conductive layer is set as a cathode. Although the specific method for the electrodeposition is not restricted, examples of the preferred methods may include a method wherein a metal (platinum) coil having a diameter of 1 to 2 cm is used as the counter electrode, an optical fiber is inserted into the coil, the coil and the tip of the optical fiber are immersed in the electrodeposition paint and a direct-current voltage is applied. In this case, the magnitude of the direct-current voltage is selected suitably, preferably about 2 to 3 V, and the time of electrodeposition is preferably about 0.01 to 5 seconds. Alternatively, by setting the magnitude of the direct-current voltage to a relatively low voltage of about 1.8 to 2.2 V (3.6 to 4.4 V/cm in terms of voltage gradient), and the time of the electrodeposition to about 8 to 12 seconds, the thickness of the electrodeposition layer can be made as thin as about 100 nm, and applying these conditions was found to be effective for forming a very small opening (0.2 to 10 nm in diameter, particularly 0.2 to 1 nm). The electrodeposition may be performed at room temperature. By changing the time of electrodeposition while keeping the voltage constant, the thickness of the electrodeposition layer may be adjusted. The preferred thickness of the electrodeposition layer is stated above. A lead wire may be bonded to the conductive layer with silver paste (a mixture of silver powder and epoxy resin) and a voltage may be applied via the lead wire.

By the step described above, a probe is obtained which has a light transmitting substrate, a conductive layer formed on the substrate and an insulating layer formed on the conductive layer. Subsequently, the insulating layer is removed from the tip of the probe. This can be done as follows.

That is, the insulating layer which was formed as stated above is washed with water and heated. The heating may be carried out in an oven. The heating conditions are not restricted, and normally heating conditions of 80 to 180° C. and about 20 minutes to 1 hour are preferable. Alternatively, by heating at 70 to 90° C. for 20 to 40 minutes and subsequently drying at 130 to 170° C. for 10 to 20 minutes, the insulating layer formed by the electrodeposition can be stably dried without being disturbed, which was found to be effective for forming a very small opening (0.2 to 10 nm in diameter, particularly 0.2 to 1 nm). By the heat treatment, the insulating layer shrinks slightly, the tip portion which is weakest in strength breaks and the tip of conductive layer is exposed, and small conductive layer-exposed region is formed. Here, because the substrate of the probe is pointed and is formed smoothly without edges so that the conductive layer formed thereon is also formed smoothly without edges except for the boundary between the portion tapered to the tip and the portion not tapered and except for the periphery of the tip of the probe, the portion except for the tip does not break to be exposed by the shrinkage of the insulating layer.

By carrying out the above-described electrodeposition using the conductive layer exposed in this way from the insulating layer as one of the electrodes and the heat treatment again, it is also possible to form a smaller conductive layer-exposed region (less than 10 nm in diameter). In this case, to expose the tip of the conductive layer by heating, the thickness of the electrodeposition layer is made thinner than the first electrodeposition by shortening the time of the electrodeposition. Alternatively, by controlling accurately to increase the thickness of the insulating layer as possible, it is possible to form a very small conductive layer-exposed region which has a diameter of not more than 10 nm in one step of electrodeposition.

By the above-described method, a very small electrode is formed on the tip of the probe. This can be employed as a cantilever as it is, but it is also possible to provide an opening by removing the conductive layer so that weak light can be radiated or condensed. As a method of forming the opening, a plurality of methods may be adopted.

In the first method, the tip of the probe is cut by a focused ion beam (FIB). The ion used is not restricted at all as long as the cutting is possible, and for example Gallium ion or the like may be employed. Because an FIB is well-known in the field of microfabrication and an FIB apparatus for performing a processing employing an FIB is also commercially available, the cutting may easily be carried out by using it. In the case where this method is applied, the whole region where the conductive layer is exposed and insulating layer is absent may be cut off. When a smaller opening is desired to be formed, the vicinity of the top of the cone-shaped conductive layer-exposed region or the top to middle of the region may be cut off.

In the second method, the conductive layer is removed by the effect of any of interatomic force or contact force, or intermittent contact force or friction force, or tunnel current which are between the probe and a surface of a sample. This method itself is the method commonly used for producing a probe for a near-field optical microscope (Patent Literature 3).

In the method described above, the conductive layer and the insulating layer are formed up to the tip of the probe, and then the insulating layer on the tip of the probe is removed. In place of this method, a method wherein a conductive layer is not formed on the tip of the probe may also be adopted. By this method, a conductive layer is not formed on the tip of the probe and naturally an insulating layer is not formed on the tip of the probe either, and for this reason, an opening is formed on the tip of the probe even if the insulating layer is not removed later. For the method that a conductive layer is not formed on the tip of the probe, a so-called oblique deposition may be adopted (Patent Literature 4). This method is the method by which a metal is not deposited on the tip of the probe by devising the position of the source of metal deposition and which is commonly used for producing a probe for a near-field optical microscope.

While, in the above-described production method, when the opening is formed by the first or second method of forming the opening, forming of the opening was carried out after electrodepositing the insulating layer and allowing to shrink the insulating layer by heating to expose the conducting layer on the tip of the probe, the insulating layer and the conductive layer may be removed by the first or the second method of forming the opening with the insulating layer formed on the tip of the probe, by omitting the process of exposing the conductive layer by heating. In the case where the opening is not formed, the insulating layer alone may be removed.

A straight probe may also be produced by the same method as that of the above-described cantilever. However, it is, of course, not necessary to curve the tip of the probe in a hook shape, and the process of producing the above-described reflecting surface may be omitted.

Since the cantilever of the present invention also functions as a cantilever of an atomic force microscope, a light-reflecting surface for detecting the displacement of the optical lever may be disposed on the back thereof (at the top of the horizontal portion in FIG. 1). The light-reflecting surface may be disposed by providing a light-reflecting plate separately or may be formed by polishing the above-described conducting layer. In the case where the light-reflecting layer is formed by polishing the conductive layer, the surface to be polished may be set by being polished together with the insulating layer or by polishing the region where the insulating layer was not formed by not immersing the region in an electrodeposition solution. Further, an insulating layer covered on the polished surface may be utilized as a reflecting surface of a light, and a light may be reflected on the conducting layer by allowing the light to transmit through the insulating layer.

The light-reflecting surface is not necessarily a polished surface. The detection of the displacement is not restricted to the optical lever method. For example, an electrical resistor may be provided on the cantilever and the displacement may be detected by the change of the value of resistance due to a strain when the cantilever changes its shape.

In the case where the straight probe is used, the tip of the probe may be oscillated in the direction parallel to the surface of a sample, and a laser beam may be radiated from the vertical direction to the longitudinal axis of the probe, then the oscillation amplitude may be detected by the intensity variation of the shadow of the laser beam interrupted by the probe. Alternatively, the probe may be fixed to the piezoelectric substance such as quartz oscillator and the oscillation amplitude may be detected by the variation of the current which is output by the piezoelectric substance.

The present invention also provides a scanning probe microscope equipped with the cantilever or the straight probe of the present invention described above. By employing the cantilever or the straight probe of the present invention described above, the scanning probe microscope having functions of an atomic force microscope, a near-field optical microscope and an electrochemical microscope at the same time may be constructed. As described above, the scanning probe microscope having functions of an atomic force microscope and a near-field optical microscope at the same time is known as described, for example, in Patent Literature 1. In the present invention, by utilizing the conductive layer as a working electrode and observing a sample in a solution in which the counter electrode and a reference electrode are placed, electrochemical changes which are based on chemical reactions and the like occurring near the sample may be detected. In order to utilize the above-described conductive layer exposed on the tip of the probe as a working electrode, it is necessary to connect the conductive layer to a wiring. However, it is not necessary that the connection should be carried out at the tip of the probe, and the conductive layer may be connected at a point distant from the tip of the probe. It is preferred, in view of fully utilizing the cantilever or the straight scanning probe, that the scanning probe microscope of the present invention has functions of an atomic force microscope, a near-field optical microscope and an electrochemical microscope at the same time, although it is not necessary for the scanning probe microscope of the present invention to be equipped with these three types of functions of microscopes at the same time. For example, the scanning probe microscope of the present invention may be equipped with two functions of microscopes which are an atomic force microscope and a near-field optical microscope at the same time. It is noted that the term "an atomic microscope" is used as a general term for a microscope which performs a method of controlling the distance between the probe and the surface of the sample by measuring the amount of strain of the cantilever when the probe is adjacent to the sample by utilizing the cantilever probe; method of controlling the distance between the probe and the surface of the sample by the changes of oscillation amplitude and phase due to the atomic force or intermittent contact force between the sample and the probe by oscillating the cantilever probe and bringing the probe close to the sample; and further, method of controlling the distance between the probe and the surface of the sample by the changes of oscillation amplitude and phase due to the friction force and the atomic force which the tip of the sample receives by utilizing the straight probe and oscillating the tip of the probe in the direction parallel to the surface of the sample.

In the case of utilizing the scanning probe microscope having functions of an atomic force microscope and electrochemical microscope at the same time without utilizing the function of a near-field optical microscope as described above, it is not necessary to make an opening at the tip of the probe. Preferably, the tip of the probe is covered with the conductive layer and, after the insulating layer is electrodeposited, the conductive layer is exposed at the tip of the probe by shrinking the insulating layer. When the tip of the substrate is sharpened, it is possible to further sharpen the tip of the probe to a diameter of not more than 30 nm as compared with the case of using the probe for a near-field optical microscope, and it is possible to make the thickness of the conductive layer that also has a light-shielding property about 5 nm to 100 nm because there is no need to add the light-shielding property to the probe, so that the resolving power for the shape image may thus be improved.

Even when the functions are limited to an atomic force microscope and an electrochemical microscope, the conductive layer may be exposed by removing the insulating layer and the conductive layer at the same time by the method of removing the conductive layer by the effect of interatomic force or contact force, or intermittent contact force or friction force, or tunnel current between the probe and the surface of a sample.

Figure 3:
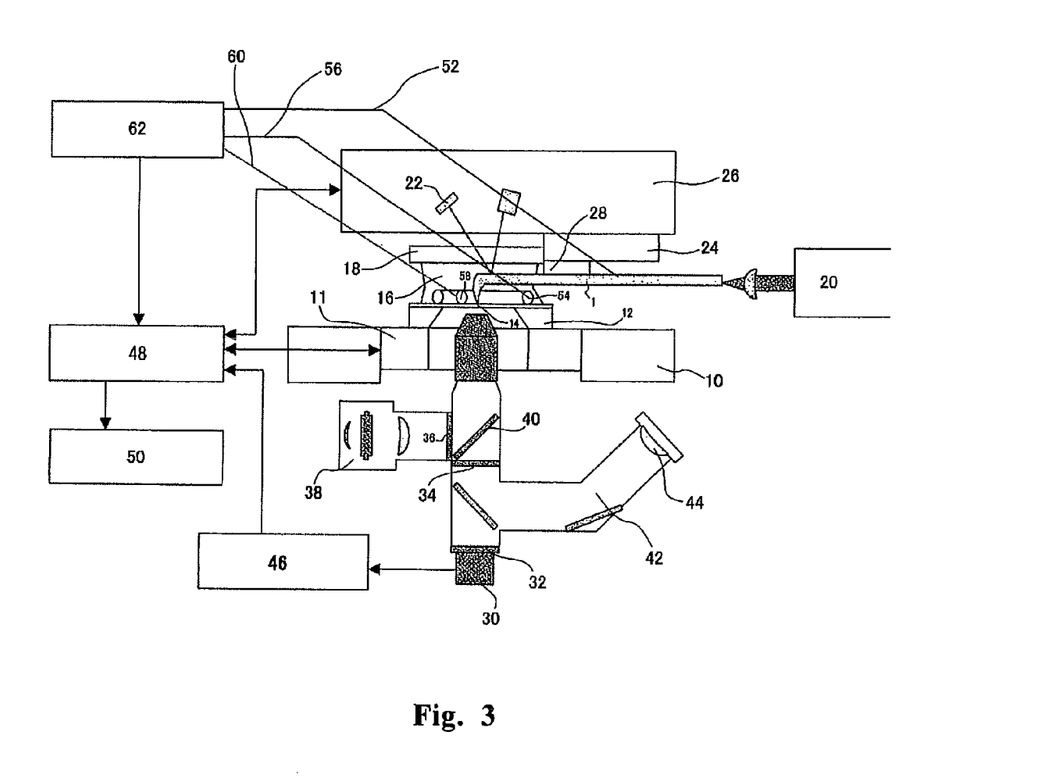
FIG. 3 is a schematic view of one of preferred examples of a scanning probe microscope of the present invention having functions of an atomic force microscope, a near-field optical microscope and an electrochemical microscope at the same time.

A schematic view of a preferred embodiment of a scanning probe microscope of the present invention which has functions of an atomic force microscope, a near-field optical microscope and an electrochemical microscope at the same time is shown in FIG. 3. In FIG. 3, reference numeral 10 denotes a base, 11 denotes a XYZ scanner, 14 denotes a sample, 1 denotes a cantilever of the present invention, 16 denotes a solution, 18 denotes a glass plate, 20 denotes a laser irradiation apparatus, 22 denotes a displacement detector which utilizes an optical lever, 24 denotes a cantilever holder, 26 denotes a measuring head, 28 denotes a piezoelectric element for excitation, 30 denotes a photodetector (an avalanche diode or a photomultiplier), 32 denotes a long path filter, 34 denotes an absorbing filter, 36 denotes an excitation filter, 38 denotes a mercury lamp, 40 denotes a dichroic mirror, 42 denotes an inverted fluorescence microscope and 44 denotes an ocular lens. The photodetector 30 is connected to a photo counter 46, and the photo counter 46 is connected to an SPM controller 48. On the other hand, the measuring head 26 is also connected to the SPM controller 48. The SPM controller 48 is connected to CRT 50 and the light measured by the photo counter 46 and the displacement of the cantilever measured by the measuring head 26 are processed by the SPM controller 48 and an image is displayed on a CRT.

Figure 4:
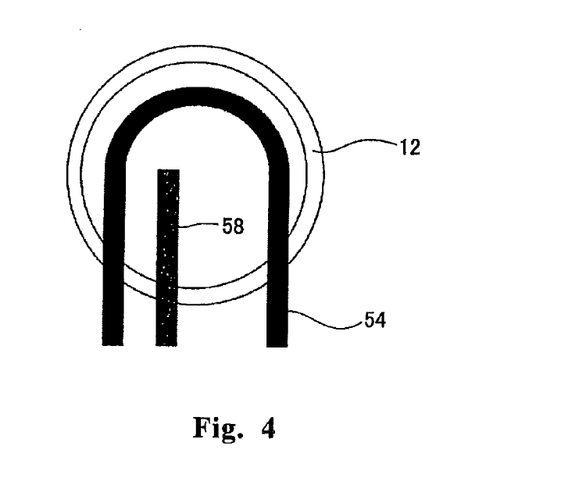
FIG. 4 is a plan view of a sample holder in one of preferred examples of the scanning probe microscope of the present invention.

The above-described constitution is that of a known scanning probe microscope, which has functions of an atomic force microscope and a near-field optical microscope at the same time as described, for example, in the Patent Literature 1. The microscope of the present invention also has the function of an electrochemical microscope. In order to provide the microscope also with the function of an electrochemical microscope, the conductive layer of the above-described cantilever which is exposed at the tip of the probe is used as a working electrode. In the example of FIG. 3, a working electrode lead wire 52 is connected to the portion of cantilever distant from the probe. Needless to say, the conductive layer with a region to which the working electrode lead wire 52 is connected is the same layer as the conductive layer exposed at the tip of the probe and they are electrically connected to each other. It is noted that a terminal may be provided on the cantilever holder and electrical connection to the conductive layer may be established via this terminal. Reference numeral 54 denotes a counter electrode and the electrode is connected to a counter electrode lead wire 56. Reference numeral 58 denotes a reference electrode and the electrode is connected to a reference electrode lead wire 60. The working electrode lead wire 52, the counter electrode lead wire 56 and the reference electrode lead wire 60 are connected to a potentiostat 62, and the potentiostat 62 is connected to the SPM controller 48. A current between the working electrode and the counter electrode 54 is measured by the potentiostat 62, and the obtained data is transmitted to the SPM controller 48 and processed by the controller 48, and then an image is displayed on a CRT 50. The plan view of the sample holder 14 is shown in the FIG. 4. As shown in FIG. 4, the counter electrode 54 is disposed near the periphery of the sample holder 12 in U-shape and the reference electrode 58 is disposed inside the U-shape. The electrochemical measurement by connecting a working electrode, a counter electrode and reference electrode to a potentiostat per se is well-known and imaging the information is also well-known in the field of electrochemical microscope.

A preferred example of specific usages of the above-described scanning probe microscope of the present invention is described in the following.

Constitution of Scanning Near-Field Optical Microscope

In the example of the above-described microscope, the scanning near-field optical microscope section is composed of an XYZ scanner mounted on the base, a probe holder incorporated in the measuring head and a displacement detecting mechanism.

Method of Controlling Distance (Measurement of Uneven Surface Image)

The measuring head is brought close to a sample by a coarse adjustment (not shown) while oscillating the cantilever near the resonance frequency by a piezoelectric element for excitation that is mounted on the cantilever holder. The coarse adjustment is stopped when the oscillation amplitude and the phase of the probe starts to change due to the effect of the interatomic force or the intermittent contact force between the sample and the probe. A distance control is performed by a Z scanner in such a way that the amplitude and the phase are constant. The uneven surface image of the sample may be measured by performing raster scan by an XY scanner while performing the distance control and displaying 3-dimensionally the voltage applied to each scanner. The measurement of the sample while oscillating the cantilever can reduce damages to the sample. Therefore, it is possible to measure a soft sample such as a cell without destroying the sample. It is noted that the distance control is performed by contact AFM without oscillating the cantilever.

Detection of Displacement of Cantilever and Measurement in Solution

A semiconductor laser is focused on the back of the cantilever and the reflected light is received by a quadrant photodiode to constitute an optical lever thereby detecting the displacement. It is possible to perform a measurement in a solution by making a film of the solution between the surface of the sample and the surface of the glass that is attached to the cantilever holder to make a constitution in which the light of the optical lever is not scattered. As a sample, for example, a living cell may be exemplified. Since the electrochemical measurement is performed in a solution, an accurate distance control is possible by making a cantilever or a probe from a material whose cross-sectional shape is circular such as an optical fiber because a periodic damping is reduced due to the solution resistance when performing a distance control by oscillating the cantilever or the straight probe. When a soft sample such as a living cell is measured, by decreasing the spring constant by shrinking the diameter of the optical fiber which is used as a material by etching or the like to not more than 50 µm, damages to the sample can be lessen and the solution resistance can be further lessen.

Measurement of Near-Field Image

A samples is fluorescent stained in advance. A laser (Ar laser having a wavelength of 488 nm) enters from the end of the cantilever and is radiated on the sample from the tip of the probe. Fluorescence is generated from the portion irradiated with the laser. This light is focused by an objective lens. In the condensed light, (i) excitation light (488 nm), (ii) fluorescence (500 nm-600 nm) and (iii) leak light of the semiconductor laser by the optical lever (785 nm) are mixed. The excitation light is removed by a dichroic mirror and an absorbing filter. Then, a long path filer having a threshold of 650 nm is inserted before the photodetector and only fluorescence is selectively entered into the photodetector by cutting off the light of the optical lever. Signals which entered the detector are converted into an electric signal then transmitted to a photon counter. A near-field imaging may be performed by performing a raster scan while keeping the distance between the probe and the sample, counting the number of the photon for each pixel, transmitting the number to a SPM controller, then imaging the intensity distribution.

Measurement of Electrochemical Image

As described above, a reference electrode and a counter electrode are provided on the sample holder, and the tip of the probe is set as a working electrode. Because the tip of the probe is connected to the conductive layer for light-shielding, a portion on the insulating film which is not in the solution is stripped off and this portion is wired (described above). An electrochemical imaging may be performed by connecting a reference electrode, a counter electrode and a working electrode to a potentiostat and transmitting the electrochemical response to the SPM controller. As a material for the working electrode, Au was used. As a counter electrode and a reference electrode, Pt was used. Iridium, paradigm, titan, carbon, copper and nickel may also be used.

The present invention will now be described in more detail by way of examples. It should be noted, however, the present invention is not limited to the Examples below.

EXAMPLES (1) Fabrication of Cantilever

As a substrate, commercially available silica optical fiber having a core diameter of 3.2 µm, and having a clad diameter of 125 µm was used. Firstly, a carbon dioxide gas laser was focused on the clad portion of the optical fiber, and the optical fiber was drawn out at the both ends to break while heating. The diameter of the tip of the optical fiber was thus sharpened to 100 nm. Then, the probe was further sharpened by an etching process. For the etching process, an organic solvent such as heptane was spread over 50% hydrofluoric acid solution to prevent the hydrofluoric acid from evaporating to make a two-phase system. The etching process was performed by dipping the tip of the probe in the hydrofluoric acid solution below the interface for 10 minutes and the diameter of the tip of the probe was sharpened to about 30 nm. By using this method, the probe portion was formed to be smooth without having steps or edges.

Subsequently, the tip of the cantilever was curved like a hook. Carbon dioxide laser was radiated on the portion of the sharpened optical fiber located at 1.5 mm from the tip of the optical fiber to deform the optical fiber from the state "0°" which is before the deformation to the state "77°" which is a hook shape. In this case, the tip of the optical fiber bends toward the direction to which the laser light is received due to the surface tension accompanied by softening because the amount of heat absorption on the side on which the laser light is received is greater than that on the other side. By using this method, the cantilever portion and the probe portion were formed to be smooth and continuous without having steps.

Subsequently, a part of the side of the cantilever opposed to the side where the probe is provided was mechanically ground with a grindstone to make a mirror surface. This mirror surface portion is used for detecting displacements by the above-described optical lever.

Subsequently, a part of the side of the cantilever opposed to the side where the probe is provided was mechanically ground with a grindstone to make a mirror surface. This mirror surface portion is used for detecting displacements by the above-described optical lever.

Subsequently, Au conductive layer was formed. This layer also functions as a light-shielding film. Firstly, a vapor deposition was performed by setting the cantilever in such a way that the hook shape probe portion of the cantilever faces the source of deposition in a commercially available deposition apparatus. At this time, in order to form a deposited film uniformly, the deposition was performed for about 5 minutes while revolving the cantilever around the tip of the probe. The thickness of the conductive layer was formed to 500 nm near the base of the probe. The thickness of the film became thinner when it is nearer to the tip of the tapered portion of the probe. The thickness of the film at the tip of the probe became about 200 nm.

At this time, the deposition at the cantilever portion was insufficient and the cantilever did not functions as a light-shielding film or as a conductor. Therefore, the second deposition was performed. The cantilever was temporarily detached from the deposition apparatus and the tip of the probe was coated with manicure to protect the tip of the probe. After that, the cantilever was fixed in the deposition apparatus so that the cantilever portion faced the source of deposition, and Au was deposited on the cantilever portion for about 5 minutes to the thickness of the film of about 500 nm while revolving the cantilever around the axis of the cantilever. After the deposition, manicure was removed by a remover. In addition, chromium may be deposited as a foundation coat to improve adhesiveness with the substrate of the probe.

Subsequently, a lead wire was connected to the Au layer by using silver paste as an adhesive. A platinum wire having a length of 7 cm was made into a shape of a coil having a diameter of about 1.5 cm and dipped in an anodic electrodeposition paint ELECO AT-X made by Shimizu co., ltd (The polymer which forms the paint film is polyacrylic acid.). The electrodeposition was performed in a two-electrode system. That is, the platinum wire was connected to the potentiostat by two cables, one for a reference electrode and one for a counter electrode. The cable for the working electrode was connected to the lead wire which was connected to the optical fiber. The optical fiber coated with Au was dipped in the solution such that the optical fiber was located at the center of the coil. A direct current of 2.0 V was applied for about 10 seconds across the Au layer as the anode and the platinum electrode as the cathode to form an insulating electrodeposition paint layer. After washing with water, the optical fiber was placed in an oven to be subjected to a heat treatment at 150° C. for 45 minutes, which allowed the electrodeposition paint film to be firmly solidified and dried. During this time, the electrodeposition paint film shrank slightly to break the tip of the projection and the Au layer at the tip of the projection was exposed from the insulating electrodeposition paint film.

Subsequently, the tip of the optical fiber was cut with a commercially available FIB apparatus (SMI-2200 made by SII Nano Technology Inc.) such that the above-described projection was cut off together with the Au layer, thereby exposing the end face of the optical fiber to form an opening. Naturally, the face of the Au layer was also exposed. The diameter of the opening (the diameter of the exposed optical fiber) was about 100 nm.

(2) Checking of Properties of Cantilever

Figure 5:
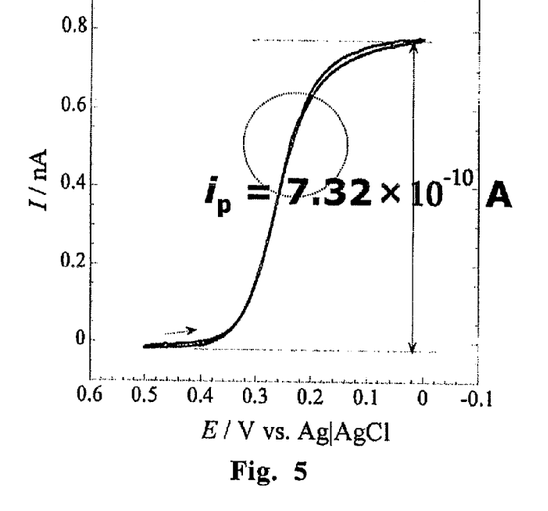
FIG. 5 shows a cyclic voltammogram obtained by using the electrode formed on the tip of the cantilever fabricated in an embodiment of the present invention.

The size of the tip of the probe fabricated was examined by obtaining a cyclic voltammogram. That is, in the same manner as in the case of the electrodeposition described above, the fabricated probe was inserted into the platinum coil as a counter electrode and dipped in a 10 mM $K_3[Fe(CN)_6]$ solution, then a voltage was applied to the probe with a scan rate of 10 mV/s to evaluate the magnitude of the current which flowed. The result is shown in FIG. 5.

Provided that the tip of the probe is circular, the radius of the electrode (the sum of the radius of the exposed substrate and the thickness of the exposed end face of the Au layer) $i_T$ is obtained by the equation:

$$i_T = 4nFDCr,$$

where n is a number of electrons, F is the Faraday constant (96485c), D is a diffusion constant of the electrode ($7.32 \times 10^{-10}$ A) and C is a concentration of $K_3[Fe(CN)_6]$ (10 mM). When these values are substituted, the radius of the electrode $i_T$ was turned out to be 263 nm. This measured value was highly consistent with the fact that the diameter of the substrate at the opening portion was about 100 nm (i.e. the radius was about 50 nm) and the fact that the thickness of the Au layer was about 200 nm.

(3) Evaluation of the Resolving Power

The cantilever of the present invention which was fabricated as described above was incorporated as a cantilever in a commercially available scanning probe microscope which has functions of an atomic force microscope and near-field optical microscope at the same time. Further, as shown in FIG. 3 and FIG. 4, the Au layer of the probe was set as a working electrode, and a counter electrode and a reference electrode were disposed in a sample holder. These electrodes were connected to the potentiostat, which was connected to a SPM controller. By using this microscope, a comb-shaped electrode was observed where Au ridges and quartz valleys having a width of 1 μm are alternately disposed to form a striped pattern. Samples were placed in a 10 mM methyl hydroxy ferrocene solution (including 500 mM of KCl), and then the current between the working electrode and the counter electrode was measured while scanning the probe with the applied voltage set to 500 mV (Ag/AgCl). On the other side, each of the measurement as an atomic force microscope and as a near-field optical microscope was performed at the same time by the conventional methods.

Figure 6:
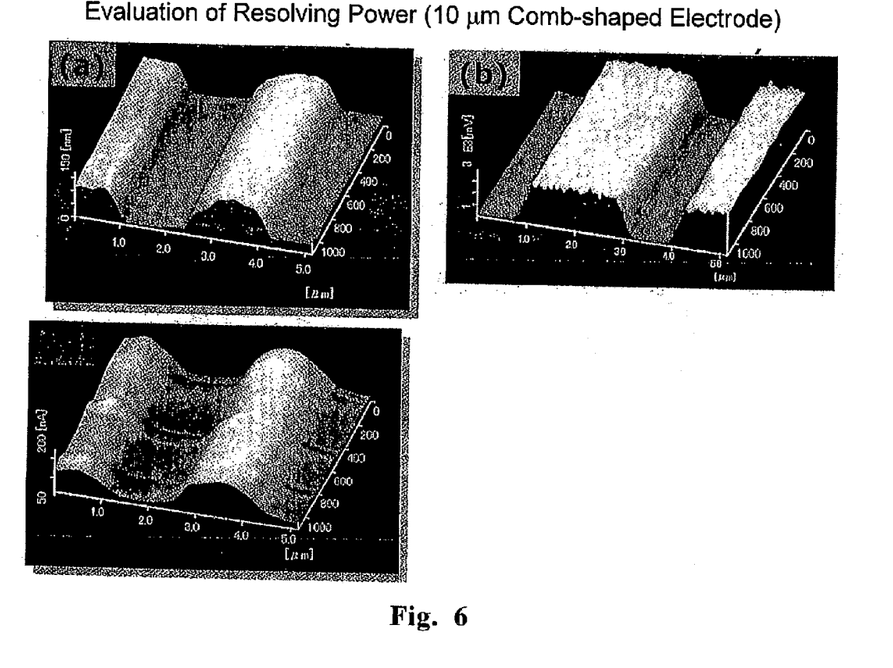
FIG. 6 shows (a) a shape image of a comb-shaped electrode, (b) a near-field image and (c) an electrochemical image which were observed simultaneously by the scanning probe microscope of the present invention fabricated in an embodiment of the present invention having functions of an atomic force microscope, a near-field optical microscope and an electro-chemical microscope.

The results are shown in FIG. 6. In FIG. 6, (a) shows the shape image measured by the atomic force microscope portion, (b) shows the near-field image measured by the near-field optical microscope portion and (c) shows the electrochemical image measured by the electrochemical microscope portion.

These results made clear that, by using the cantilever of the present invention as a cantilever for a scanning probe microscope, a shape image by the atomic force microscope, a near-field image by the near-field optical microscope and an electrochemical image by the electrochemical microscope may be observed at the same time.

The invention claimed is:

1. A cantilever for a scanning probe microscope, said cantilever comprising:
   a probe provided on the tip of said cantilever, the probe comprising:
      a substrate that is at least partly light transmitting;
      a conductive layer formed on said substrate; and
      an insulating layer laminated on said conductive layer; and
   an optical waveguide communicating with said light transmitting substrate of said probe, said light transmitting substrate existing continuously up to the tip of said probe, wherein when said probe is viewed from the tip end, said conductive layer is formed on the periphery of an opening of the tip of said probe on which said conductive layer is absent, wherein said insulating layer is formed on the periphery of said conductive layer, wherein a distal end of the substrate does not extend past a distal end of the insulating layer, wherein the surface of said conductive layer is formed smoothly without a step or edge, and wherein a distal end of the conductive layer, the distal end of the substrate and the distal end of the insulating layer are coplanar.

2. The cantilever of claim 1, wherein said cantilever is formed of an optical fiber integrally with said probe, and
wherein the tip of said optical fiber is pointed and the tip of said optical fiber is curved from the longitudinal axis of said optical fiber.

3. The cantilever of claim 1 or 2, wherein the outermost surface of said conductive layer is made of gold, gold alloy, platinum or carbon.

4. The cantilever of claim 1, wherein said scanning probe microscope has functions of an atomic force microscope, an electrochemical microscope and a near-field optical microscope;
wherein said conductive layer is used as a working electrode of said electrochemical microscope; and
wherein an evanescent light is radiated and/or an evanescent light generated from a surface of a sample is condensed through said light transmitting substrate.

5. A straight probe for a scanning probe microscope, said probe comprising:
a substrate that is at least partly light transmitting;
a conductive layer formed on said substrate; and
an insulating layer laminated on said conductive layer;
said light transmitting substrate existing continuously up to the tip of said probe,
wherein when said probe is viewed from the tip end, said conductive layer is formed on the periphery of an opening of the tip of said probe on which said conductive layer is absent,
wherein said insulating layer is formed on the periphery of said conductive layer,
wherein a distal end of the substrate does not extend past a distal end of the insulating layer, and
wherein the surface of said conductive layer is formed smoothly without a step or edge,
wherein a distal end of the conductive layer, the distal end of the substrate and the distal end of the insulating layer are coplanar.

6. The probe of claim 5, wherein the outermost surface of said conductive layer is made of gold, gold alloy, platinum or carbon.

7. The probe of claim 5, wherein said scanning probe microscope has functions of an atomic force microscope, an electrochemical microscope and a near-field optical microscope;
wherein said conductive layer is used as a working electrode of said electrochemical microscope; and
wherein an evanescent light is radiated and/or an evanescent light generated from a surface of a sample is condensed through said light transmitting substrate.

8. A process of producing said cantilever of claim 1, said process comprising the steps of:
forming said conductive layer on said substrate;
forming said insulating layer by electrodeposition of an insulative paint using said conductive layer as one of electrodes;
heating the formed insulating layer to expose said conductive layer at the tip of said probe; and
removing at least a part of the conductive layer exposed from said insulating layer at the tip of said probe to form an opening.

9. The process of claim 8, wherein at least a part of the conductive layer is removed together with the substrate thereunder by irradiation of an ion beam.

10. A scanning probe microscope comprising said cantilever of claim 1.

11. A scanning probe microscope comprising said probe of claim 5.

12. The scanning probe microscope of claim 10 which has a function of an atomic force microscope by measuring the displacement of said cantilever;
a function of an electrochemical microscope by measuring electrochemical reactions using said conductive layer as a working electrode; and
a function of a near-field optical microscope by radiating an evanescent light and/or condensing an evanescent light generated from a surface of a sample through light transmitting substrate on the tip of said probe.

13. The scanning probe microscope of claim 11 which has a function of an atomic force microscope by measuring the displacement of said cantilever;
a function of an electrochemical microscope by measuring electrochemical reactions using said conductive layer as a working electrode; and
a function of a near-field optical microscope by radiating an evanescent light and/or condensing an evanescent light generated from a surface of a sample through light transmitting substrate on the tip of said probe.

14. The cantilever of claim 1, wherein the substrate comprises a core and a cladding layer.

15. The probe of claim 5, wherein the substrate comprises a core and a cladding layer.

16. The cantilever of claim 1, wherein the conductive layer directly contacts the substrate and the insulating layer, and
wherein the insulating layer forms an outermost layer.

17. The probe of claim 5, wherein the conductive layer directly contacts the substrate and the insulating layer, and
wherein the insulating layer forms an outer most layer.

18. The cantilever of claim 1, wherein a diameter at a distal end of the opening at the tip end is between 0.2 nm and 200 nm.

19. The probe of claim 5, wherein a diameter at a distal end of the opening at the tip end is between 0.2 nm and 200 nm.

* * * * *